Figure 1A:
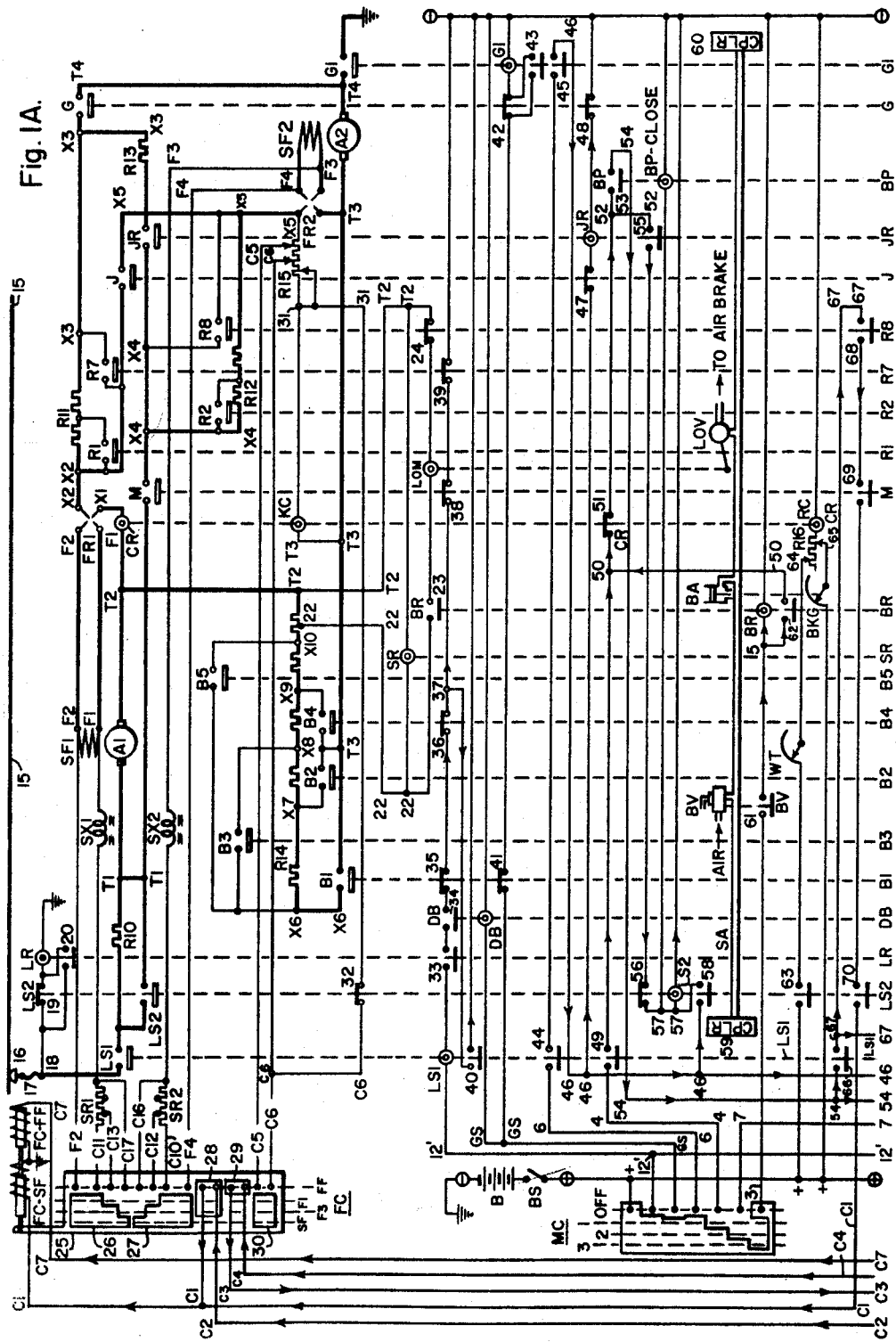

April 19, 1960     G. R. PURIFOY     2,933,667
DYNAMIC-BRAKE CONTROL-SYSTEMS
Filed July 31, 1957     3 Sheets-Sheet 1

*LOSS OF POWER IN NO.15 POWER-STEP P15.

Fig. 2.

United States Patent Office 2,933,667
Patented Apr. 19, 1960

2,933,667

DYNAMIC-BRAKE CONTROL-SYSTEMS

George R. Purifoy, Pittsburgh, Pa., assignor to Westinghouse Electric Corporation, East Pittsburgh, Pa., a corporation of Pennsylvania Application July 31, 1957, Serial No. 675,489

7 Claims. (Cl. 318—60)

My invention relates to a dynamic-braking control-assembly for two direct-current series motor-means for a common load-device such as an electrically propelled vehicle, and it has particular relation to an electrical control-system for an electrically propelled railway-car, which is adapted to be operable either singly or as a unit of a multiple-unit train, such as is used in a rapid-transit system.

My invention relates to an improved control-system which overcomes certain difficulties which have been heretofore encountered in the dynamic-braking equipment.

One object of my invention is to make it impossible to obtain dynamic-braking until the car has attained a speed which is higher than is obtained in the switching on-position of the master controller. This provision is made, because, when the car-speed is low, dynamic brake will be slow in building up, resulting in an air inshot on the air-brake system.

Another object of my invention is to provide a means whereby a "service" dynamic-braking application may be released on a dead car in a multiple-unit train, in the event that there had been a loss of power in said dead car before the "service" brake-application was made. This release, or interruption of the continuity, of the "service" dynamic-braking circuit makes it possible to tow the dead car as a trailer, without burning out the dynamic-braking-circuit resistances, which are not rated for continuous operation.

A more detailed explanation of the specific features of my invention will be given in the following description, and will be defined in the appended claims, in connection with an illustration of an exemplary form of embodiment of the invention in the accompanying drawing. The basic wiring-diagram which I have chosen, to embody changes incorporating my present invention, is that which is shown in my application Serial No. 642,742, filed February 27, 1957, for Traction-Motor Control, although it is to be understood that I am not limited to this particular type of control diagram. In the drawing, Figs. 1A and 1B, taken together, constitute a much simplified wiring-diagram of the circuits and apparatus which are necessary for an understanding of the novel features of the invention, in a preferred form of embodiment; and Fig. 2 is a sequence chart of the operation.

Figure 1B:
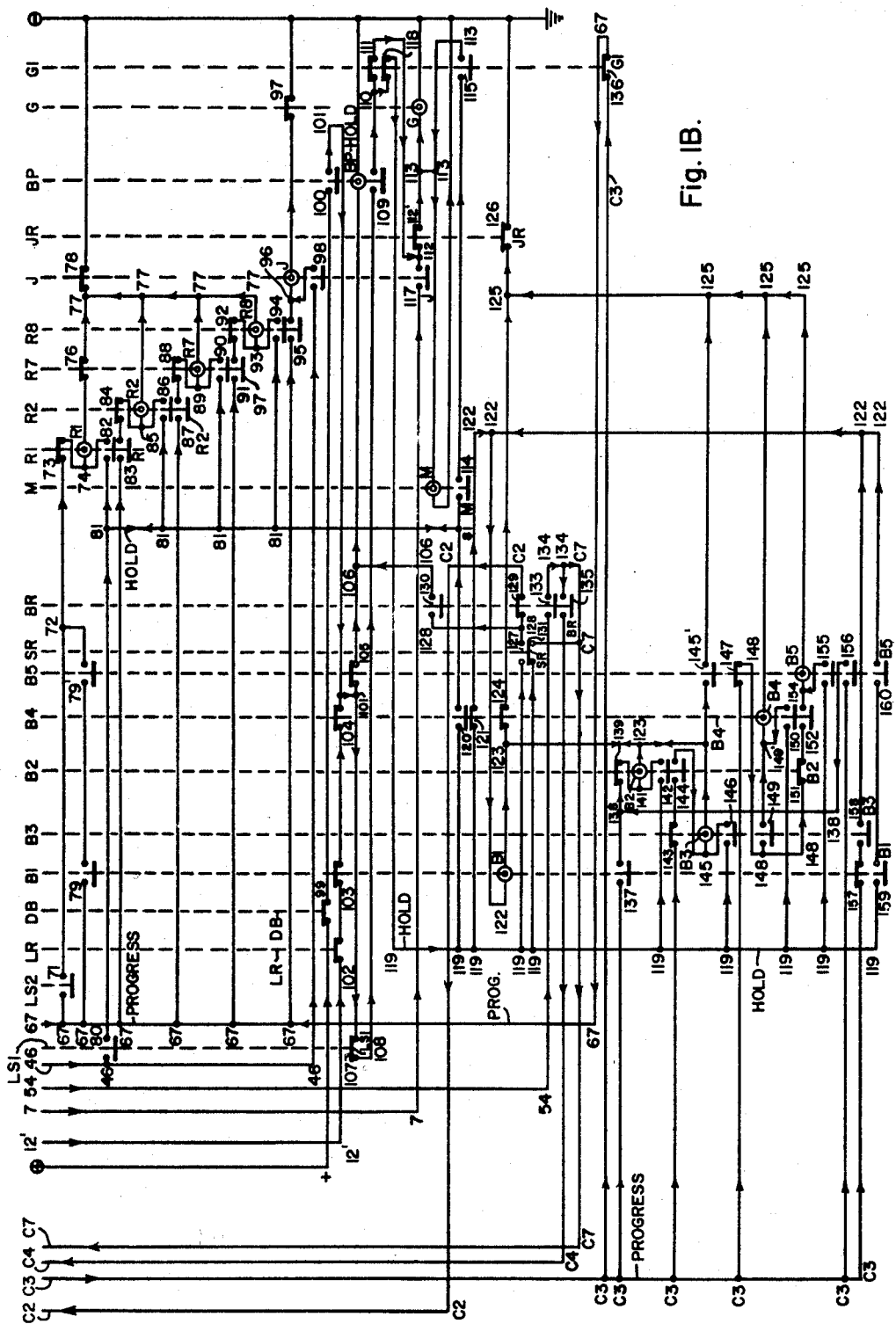

Figs. 1A and 1B represent some of the equipment which is carried by a single electrically propelled railway-car embodying my invention. Direct-current power is supplied to the car from a third rail 15 or a trolley wire, which is engaged by a third-rail shoe 16, or by a trolley pole, pantograph or other current-collecting equipment carried by the car. The third-rail shoe 16 is connected through a third-rail fuse 17 to a conductor 18 which constitutes a supply-circuit for the car.

The traction-motors for the car are direct-current series motors, which are shown in Fig. 1A, by way of a simple example, as comprising two motor-armatures A1 and A2, each being associated with its own series field winding SF1 and SF2, respectively. Each of the two series motors may be regarded as representing a motor-means or circuit, each of which may comprise two or more motors which are, at times, switched as a single motor-means or circuit. For example, in most multiple-unit rapid-transit trains, each car or unit is driven by four motors, connected in two motor-circuits, each motor-circuit comprising two motors which are permanently connected in series with each other.

In Fig. 1A, the first series-motor means or circuit comprises, in series, an armature-terminal T1, a motor-armature or armatures A1, an armature-terminal T2, a series relay-coil CR of a limit-relay which is also designated CR, an intermediate circuit or conductor X1, a field-reverser FR1, a field terminal F2, a series mainfield winding or windings SF1 for supplying the field-excitation for said armature or armatures A1, a field-terminal F1, the field-reverser FR1 again, and an intermediate circuit or terminal X2. The corresponding parts for the second series-motor means or circuit are indicated at T4, A2, T3, FR2, F4, SF2, F3, FR2 again, and X5, noting that the series relay-coil CR is not present in this second series-motor means or circuit.

A series-parallel motor-control arrangement is shown in Fig. 1A, in which a line-switch LS1 and a ground-switch G1 are used as power-switching means for establishing a power-circuit for energizing the motors, by connecting the armature-terminal T1 to the supply-circuit 18, and connecting the armature-terminal T4 to ground. For completing the series-circuit connections, a series-motor switch JR is closed, in addition to the power-switches LS1 and G1. For parallel-motor operation, two parallel-motor switches M and G are closed in addition to the power-switches LS1 and G1. The parallel-motor switch M provides a circuit-connection between the armature-terminal T1 of one series-motor means, and the intermediate connection or terminal X5 of the other series-motor means; while the other parallel-motor switch G provides a circuit-connection between the armature-terminal T4 and the intermediate connection or terminal X2. During an intermediate transition-period, a transition-switch J is closed. These motor-controlling connections are all in accordance with a well-known switching-system.

A suitable number of series-connected accelerating resistances are used, as indicated at R10, R11, R12 and R13. The resistance R10 is disposed between the supply-line 18 and the first armature-terminal T1, and this resistance R10 is shorted out by means of a second line-switch LS2. The resistance R11 is in series between the intermediate connection or terminal X2 and an intermediate connection-point X3, which is connected to the terminal T4 through the parallel-connection switch G; and said resistance R11 is progressively reduced or shorted out by means of any desired number of switch-contacts of which only R1 and R7 are shown. The resistance R12 is in series between the intermediate terminal X5 and an intermediate connection-point X4, which is in turn connected to the terminal T1 by the parallel-connection switch M; and said resistance R12 is progressively reduced or shorted out by any desired number of switch-contacts, of which only R2 and R8 are shown. The resistance R13 is in the series-motor connection, which is made between the points X3 and X4 by the switch JR, and this resistance R13 is finally shorted out by the transition-switch J, which makes a connection between the intermediate connection-points X2 and X5, for obtaining the full-series power-circuit connection of the motors.

Dynamic-braking circuits are established by opening the two power-switches LS1 and G1, and closing a braking-switch B1 in addition to the two parallel-connection switches M and G, also in accordance with a well-known system or arrangement. The braking-switch B1 provides a common dynamic-braking circuit-connection X6, X7, X8, X9 and X10 between the armature-terminals T3 and T2 of the two series-motor means, thus providing two dynamic-braking circuits wherein the motor-armature or armatures of each of said series-motor means are loaded by the field winding or windings of the other one of said series-motor means, in series with one of the accelerating resistances R11 and R12.

During both series and parallel motor operation, and also during dynamic-braking, the switch-contacts R1, R2, R7 and R8 are successively or progressively closed in any manner which is suitable for progressively reducing the resistances. During parallel motor operation, after all of the accelerating resistances R11 and R13 have been cut out, the field-strengths of the motors are progressively reduced, to provide shunted-field operating-conditions.

In accordance with a usual arrangement, the motor-fields are reduced by equipping each of the series field windings SF1 and SF2 with a field-shunt, comprising an inductive reactor SX1 and SX2, respectively, and a variable resistor SR1 and SR2, respectively. The field-shunts SX1—SR1 and SX2—SR2 are first connected in parallel relation to their respective field-windings SF1 and SF2, by means of contact-terminals C11 and C10, respectively, of any suitable progressively or sequentially operating field-controlling means, which is herein illustrated as an electrically operated drum-type field-controller FC. After the respective field-shunts have been connected into operation, the field-shunt resistances SR1 and SR2 are then progressively shorted out by successive controller-points, of which only C13 and C17 are shown for SR1, and only C12 and C16 are shown for SR2, as the field-controller FC is moved from its initial full-field position FF, through its intermediate positions, of which only F1 and F3 are shown, to its shunted-field position SF, at which point the field-winding currents are reduced to about 40% of their unshunted values.

During dynamic braking, the braking-switch B1 connects the two motors through the common dynamic-braking circuit-connection X6 to X10, which contains a five-part braking-resistance R14 which is not a part of the motor-accelerating circuit. This braking-resistance R14 is used, in addition to the previously mentioned accelerating-resistances R11 and R12, in establishing the complete dynamic-braking circuits. The braking-resistance R14 is progressively reduced in value, by means of a suitable operation of braking-switches B2 to B5, in addition to the main braking-switch B1, during the dynamic-braking operation, and after the braking-resistance R14 has been reduced in value as much as it is going to be reduced, by the braking-switches B1 to B5, the acceleration-resistances R11 and R12, or portions thereof, are progressively shorted out, or reduced in value, by the acceleration-switches R1, R2, R7 and R8.

The progressive operation of the various resistance-shorting switches, during both motoring operation and dynamic braking, is under the automatic control of a suitable limit-relay CR, which is energized to be controllably responsive to conditions which accompany current-increments in the motor. Such a limit-relay is illustrated, in Figs. 1A, 1B and 1C, in the form of a current-relay CR which is provided, in the illustrated form of embodiment of my present invention, with at least three operating-coils, namely, the previously mentioned series coil CR, a kick-coil KC, and a rate-coil RC, all acting cumulatively to cause a relay-response. The series coil CR is a one-turn current-coil which is serially connected between the points T2 and X1 in the motor-accelerating part of one of the motor-circuits, as is well-known. The kick-coil KC is a multiturn shunt relay-coil which is connected across the terminals T3 and X5 of the series main-field winding SF2 of the other motor-circuit, with a variable resistor R15 connected in series with the kick-coil KC for recalibrating purposes, as will be subsequently described. The rate-coil RC is a multiturn battery-energized coil which is controlled for recalibration purposes during motoring and braking, as will be subsequently described. This limit-relay CR has a back-contact 51 which is normally closed, in the non-actuated or low-current position of the relay.

All of the electrically controlled relays and switches which are shown in the drawing are diagrammatically indicated as having vertical switch-stems (indicated by dotted lines), which are biased by gravity toward their lowermost positions, and all of these relays and switches are shown in their deenergized or non-actuated positions. All of the relays and switches are electrically controlled, and they are illustrated as being electrically or magnetically operated, by means of an appropriately numbered or lettered coil or solenoid, represented by a circle, acting magnetically to lift an armature which is represented diagrammatically by a smaller circle inside of the coil-circle. In general, the same switch-designation is applied to any particular switch, its coil, and its contacts, by way of identification of the parts belonging to a given switch or relay.

Energy for the various relay-circuits or control-circuits is provided by means of a battery B on each car, as shown just below the left center in Fig. 1A. The negative terminal (—) of the battery is permanently grounded, to constitute the negative bus (—) of the relay-circuits; while the positive terminal of the battery is connected, through a battery-switch BS, to the positive bus (+) of the relay-circuits.

At the top of the main motor-circuits in Fig. 1A, I show the supply-circuit 18 as being used to energize a line-relay LR through a back-contact 19 of the second line-switch LS2. This line-relay LR picks up when an adequate line-voltage appears on the supply-conductor 18. This line-relay has a made-contact 20 which by-passes the LS2 back-contact 19 when the line-relay is energized.

A braking-current-responsive circuit 22–T2 is shown immediately below the main motor-circuits in Fig. 1A. This circuit is energized from a tap-point 22 in the last section of the braking-resistance R14, so that this circuit 22–T2 is not energized except when a braking circuit is established. I show a circuit extending from the conductor 22, through the operating-coil SR of a spotting-relay SR, and thence to the circuit T2, in a known manner. Another circuit is also shown, extending from the conductor 22, through a make-contact 23 of a subsequently described brake-relay BR, then through the magnet-coil LOM of a subsequently described lock-out magnet, and then through a back-contact 24 of the resistance-shorting switch R8, to the circuit T2.

The exemplary field-controller FC, which is illustrated in the top left portion of Fig. 1A, consists of a drum 25, carrying five contact-segments 26 to 30. The segment 26 engages the field-terminal F2 and the odd-numbered controller-contacts C11 to C17 in the previously described field-shunting progression, while the segment 27 engages the field-terminal F4 and the even-numbered controller contacts C10 to C16, in the previously described field-shunting progression. The segment 28 engages two controller-circuits C1 and C2 in the controller-positions FF through F3. The segment 29 engages two controller-circuits C3 and C4 in the full-field position FF of the field-controller FC. The segment 30 engages two controller-circuits C5 and C6 in the controller-positions F1 through SF; and these controller-circuits C5 and C6 are connected to adjustable intermediate tap-points C5 and C6 on the kick-coil resistor R15.

The drum 25 of the field-controller FC is operable to its full-field position FF by any suitable means, which is simply illustrated in the form of a solenoid or magnet-coil FC–FF, which is energized between ground and a controller-circuit C7. The drum 25 is operable to its shunt-field position SF by any suitable means which is illustrated as a solenoid or magnet-coil FC–SF, which is energized between ground and the controller-circuit C1. The drum 25 remains in its set position, if neither of its coils FC–FF or FC–SF is energized, or if both of said coils should be energized simultaneously.

The kick-coil resistance R15 is provided with a terminal 31 at the end of the resistance which is closest to the tap-point C6, and this terminal 31 is shown as being connected, through a back-contact 32 of the second line-switch LS2, to the aforesaid tap-point C6.

Each end of the illustrated car is provided with a motorman's master controller MC, only one of which is indicated in the drawing, since the master controller at the other end of the car is a duplicate of the illustrated controller. The master controller MC is illustrated in a simplified form, as having an off-position and three on-positions 1, 2 and 3. In each of the three on-positions of the master-controller MC, the positive control-wire (+) is connected to three trainline wires 12′, GS and 6. In the second and third on-positions of the accelerating-drum of the master controller MC, a trainline wire 4 is energized from the positive bus (+); while in the third on-position of this controller, a trainline wire 7 is energized from the positive bus (+). In the off-position of the master controller MC, a connection is made from the positive bus (+) to a trainline wire 3. During the off-movement of the master controller, in passing from the No. 1 on-position to the off-position, the trainline wire 3 is energized and the trainline wire GS is deenergized, both prior to the deenergization of the trainline wires 12′ and 6.

The first on-position of the master controller MC, in Fig. 1A, is a train-switching position, in which the car or train is slowly moved, at its minimum speed, for moving the car or train for short distances. In this No. 1 controller-position, the control-wires 12′, GS and 6 are energized.

As shown near the center of Fig. 1A, the wire 12′ energizes an exciting-circuit which first extends through the operating coil LS1 of the line-switch LS1, then extends through a make-contact 33 of the line-relay LR, a make-contact 34 of a so-called door-brake relay DB, a back-contact 35 of the brake-switch B1, a back-contact 35 of the brake-switch B4, a circuit 37, a back-contact 38 of the parallel-connection switch M, and a back-contact 39 of the resistance-shorting switch R7, to the negative bus (−). A hold-circuit is also provided, between the circuit 37 and the negative bus (−), through a make-contact 40 of the line-switch LS1.

The next circuit shown in Fig. 1A is an energizing-circuit from the wire GS to the operating coil DB of the door-brake relay DB, followed by another energizing circuit from the same wire GS, through a back-contact 41 of the brake-switch B1 and a back-contact 42 of the parallel-connection switch G, to the operating coil G1 of the ground-switch G1. The G-switch contact 42 is connected in parallel to a make-contact 43 of the ground-switch G1.

Next comes a circuit from the wire 6, through a make-contact 44 of the line-switch LS1, and a make-contact 45 of the ground-switch G1, to a relaying-circuit 46. This relaying-circuit 46 is first used to energize the operating coil of the series-motor switch JR, through a back-contact 47 of the transition-switch J, and a back-contact 48 of the parallel-connection switch G.

In the order in which the circuits are shown in Fig. 1A, the next circuit is a connection from the wire 4, through a make-contact 49 of the line-switch LS1, a conductor 50, the CR limit-relay back-contact 51, a conductor 52, and a make-contact 53 of a brake-power protective relay BP, to a control-circuit 54. It will be recalled that the wire 4 was first energized in the No. 2 on-position of the master controller MC. This is the master-controller position in which it is desired to initiate the progressive operation of the resistance-reducing switches in the series motor-connection of the traction motors A1 and A2, in order to smoothly accelerate the car or train.

In accordance with one feature of my present invention, I provide the conductor 52 with a branch-connection which extends down and to the left, through a JR make-contact 55 and an LS2 back-contact 56, to a circuit 57 which energizes the operating coils BP–Close and LS2 of both the brake-power relay BP and the second line-switch LS2. This LS2 switch acts as the first acceleration-progression switch, by short-circuiting the first accelerating-resistor R10 in the main motor-circuit. Heretofore, a prevalent circuit-arrangement has energized this LS2 switch from the control-circuit 54 (in series with the BP interlock 53), instead of energizing said LS2 switch from the intermediate conductor 52; so that, according to said previous circuit-arrangement, said line-switch LS2 could not be closed or actuated unless the brake-power relay BP was closed. According to my present invention, as will be subsequently apparent, I do not energize the brake-power relay BP (or equivalent circuit-means serving as a condition precedent to a dynamic-braking operation), until the car-speed has become, or is in the process of becoming, higher than is attained in the No. 1 switching-service position of the master controller MC: hence my use of the intermediate control-circuit connection 52, which is not energized until after the master controller MC has reached its No. 2 on-position.

When the second line-switch LS2 is actuated, it closes a make-contact 58 which establishes a holding-circuit from the relaying-circuit 46 to the energizing-circuit 57 which energizes both the actuating-coil of this LS2 switch and the actuating or closing-coil BP–Close of the brake-power relay BP.

As shown near the bottom of Fig. 1A, the car is provided with two couplers 59 and 60, one coupler at each end, these couplers being used for making drawbar connections with other cars, and for making, inter alia, various air-connections, such as connections for a so-called "straight-air" pipe SA which is provided on each car which is to be usable as a unit of a multiple-unit train. A brake-valve BV is provided, for supplying compressed air at a controllably varied pressure to the "straight-air" pipeline SA when a "service" braking-operation is required, that is, when a substantial braking-force is to be applied to the car or train, as distinguished from the very small, usually negligible, braking-forces which are normally produced by the dynamic-braking circuits during the so-called "spotting" operation of the dynamic-braking equipment, which will be subsequently described.

The pressure of the air in the straight-air pipe SA is responded to by a brake-actuator cylinder BA, which is connected to said straight-air pipe, and which is provided with a piston which lifts a vertically illustrated dotted-line actuator-stem.

As has been common in previous dynamic-braking railway-cars, the straight-air pipe SA is connected to air-brake equipment of each car by means of a lock-out valve LOV, which is electrically closed, upon the energization of the lock-out magnet LOM, and which is released when the lock-out magnet LOM becomes substantially deenergized. In this way, when the so-called fade-out point has been reached, and the braking-force of the dynamic-braking circuits becomes very small, the air-brake equipment is brought into operation, to finish bringing the train to a complete standstill.

Next, in Fig. 1A, there is shown a circuit from the wire 3 to a make-contact 61 which is closed when the brake-valve BV is actuated from its off-position to any on-position for any degree of brake-application. From this BV make-contact 61, a circuit continues to a wire 5, which energizes the operating coil BR of a brake-relay BR, which is thus actuated whenever a "service" braking-operation is called for by any on-position of the brake-valve BV. The brake-relay BR carries a number of contacts, the first one of which is a make-contact 62 which establishes a circuit-connection from the wire 5 to the conductor 50.

Near the bottom of Fig. 1A, a circuit is next shown, from the positive bus (+) to an LS2 make-contact 63, and thence through a weight-controlled rheostat WT to a tap-point 64 of an adjustable resistance R16, which is used to energize the rate-coil RC of the limit-relay CR. This rate-coil energizing-circuit, which includes the weight-responsive rheostat WT, is thus energized as soon as the accelerating progression of the motors is initiated, as supervised by the LS2 interlock 63. The weight-responsive rheostat WT is a known device, which is automatically adjusted according to the variable weight or live load carried by the car, so that the rate-coil RC is the more strongly excited during light-weight conditions during the accelerating progression of the motors, thus controllably reducing the minimum-current setting at which the limit-relay CR picks up and opens its back-contact 51 during the motor-circuit progression in the power-operation of the motors. This is a well-known, and practically necessary, expedient, the operating mechanism thereof being symbolically indicated by the letters WT.

A second energizing-circuit is provided for the rate-coil RC, extending from the positive bus (+) through a braking-responsive rheostat BKG to a tap-point 65 on the adjustable resistance R16 which energizes the rate-coil RC. The resistance-adjusting contact-arm of the braking-responsive rheostat BKG is moved by the brake-actuator BA, in an amount which is dependent upon the amount of braking which is called for by the brake-valve BV which controls the air-pressure in the straight-air pipe SA, to which the brake-actuator cylinder BA is connected. This braking-responsive rheostat BKG has its resistance automatically increased in response to the amount of brake-application called for by the brake-valve BV, so that the rate coil RC has its maximum dynamic-braking excitation when a low braking-rate is called for, thus providing a low minimum-current setting at which the limit-relay CR picks up and opens its back-contact 51 during dynamic braking.

At the bottom of Fig. 1A, a circuit extends from the control-circuit 54, through a make-contact 66 of the line-switch LS1, to a progress-wire 67, and thence through a make-contact 68 of the last resistance-switch R8, a make-contact 69 of the parallel-connection switch M, and a make-contact 70 of the second line-switch LS2, to the field-controller circuit C1 which energizes the shunt-field coil FC–SF of the field-controller FC. During the motoring operation, this energization of the shunt-field coil FC–SF occurs at the end of the full-field parallel-connection acceleration, and it initiates the progression of the field-controller FC from its full-field position FF to its shunt-field position SF.

At the top of Fig. 1B, there is shown a circuit extending from the progress-wire 67 through a make-contact 71 of the LS2 switch, to a conductor 72, and thence through a back-contact 73 of the first resistance-switch R1 to a conductor 74, and thence through the operating-coil R1 of this switch, and through a back-contact 75 of the resistance-switch R7, to a conductor 77, and finally through a back-contact 78 of the transition-switch J, to the negative bus (—). The LS2 contact 71, at the beginning of this circuit, closes, with the closing of the second line-switch LS2, at the beginning of the motor-accelerating progression. This contact 71 is bypassed by a make-contact 79 of the braking-switch B1, in series with a make-contact 79′ of the braking-switch B5, so as to re-energize the progression-circuit 72 to the first resistance-switch R1, at the proper time during the dynamic-braking progression.

Next, in Fig. 1B, there is shown a circuit from the relaying-circuit 46, through a make-contact 80 of the line-switch LS1, to a hold-wire 81, and finally through a make-contact 82 of the first resistance-switch R1 to the energizing-circuit 74 of this switch.

As shown in Fig. 1B, the progression continues, from the progress-wire 67, through a make-contact 83 of the resistance-switch R1 and a back-contact 84 of the resistance-switch R2, to a conductor 85, and thence through the operating-coil of the resistance-switch R2 to the previously mentioned conductor 77. Next is shown a circuit from the hold-wire 81 through a make-contact 86 of the resistance-switch R2, to the energizing-circuit 85 of this switch.

A progress-connection is next made from the progress-line 67, through an R2 make-contact 87, an R7 back-contact 88, a circuit 89, and the R7 energizing-coil, to the circuit 77. A hold-circuit is also provided from the hold-wire 81 through an R7 make-contact 90 to the energizing-circuit 89 of this R7 switch.

A progress-circuit is next shown, from the progress-wire 67, through an R7 make-contact 91, an R8 back-contact 92, a circuit 93, and the R8 energizing coil, to the circuit 77. A hold-circuit is also provided from the hold-wire 81 through an R8 make-contact 94 to the circuit 93.

From the progress-wire 67 in Fig. 1B, a circuit next extends through an R8 make-contact 95 to a conductor 96, which energizes the operating-coil J of the transition-switch J through a back-contact 97 of the parallel-connection switch G. A hold-circuit is also provided from the relaying circuit 46 through a make-contact 98 of the J switch, to the circuit 96.

As covered in my previously mentioned application Serial No. 642,742, I next show, in Fig. 1B of the accompanying drawings a circuit extending from the positive bus (+) through a back-contact 99 of the door-brake relay DB to a make-contact 100 of the brake-power relay BP, and thence to a circuit 101 which will be used in the energization of the hold-coil BP-Hold.

In accordance with my present invention, I also provide a back-contact 102 on the line-relay LR, and I use this back-contact to provide a second energizing-circuit for the conductor 101, this second energizing-circuit extending from the bottom of the wire 12′ in Fig. 1B, and passing through the LR back-contact 102, a B1 back-contact 103, and a B4 back-contact 104, to said circuit 101.

In accordance with my present invention, the circuit 101 extends down and to the right, to pass through a B5 back-contact 105, which is representative of a contact which is opened at an intermediate point in the progression of the dynamic-braking circuit. From this B5 back-contact 105, the circuit extends on, to a conductor 106 which serves as an energizing-circuit for the hold-coil BP-Hold of the brake-power relay BP.

The circuit 101 is also provided with a branch, extending to the left, and passing through an LS1 back-contact 107, a conductor 108, a BP make-contact 109, a conductor 110, and a G1 back-contact 111 to a conductor 112. The circuit 112 extends on, through, a JR back-contact 112′ to a conductor 113, which constitutes an energizing-circuit for energizing both the G-coil and the M-coil of the two parallel-operation switches G and M. A hold-circuit is also provided, during the parallel-motor power-operation, this hold-circuit extending from the bottom of the hold-wire 81, through a make-contact 114 of the M-switch and a make-contact 115 of the G1 switch, to the previously mentioned conductor 113. I also provide another energizing-circuit, which comes in from the left, to energize the aforesaid conductor 112. This energizing-circuit extends from the bottom of the wire 7, and passes through a make-contact 117 of the transition-switch J, to energize the circuit 112 when a parallel motoring-connection is to be provided.

The previously mentioned conductor 110 also has a downwardly extending branch, which extends through a G1 back-contact 118 to a circuit 119, which serves various purposes in connection with the dynamic-braking circuits, including operations necessary to the initial establishment of the dynamic-braking circuit in its "spotting" condition; and also, later on, during a "service" braking-application, serving as a hold-wire 119 for the switches which control the progressive reduction in the resistance of the dynamic-braking circuits during a service-application of dynamic-braking. A first branch-circuit from the hold-wire 119, in Fig. 1B, extends through a B4 make-contact 120 to the hold-circuit 81 of the accelerating-resistance switches R1 to R8, so as to pave the way for a progressive operation of said accelerating-resistance switches R1 to R8 after the completion of the progressive operation of the braking-switches B1 to B5, during the dynamic-braking progression.

Next, in Fig. 1B, is shown a circuit from the hold-wire 119, through a B4 back-contact 121 to a circuit 122, which has a branch extending over to the left, to pass through the operating coil B1 of the first braking-switch B1, after which the circuit continues through a conductor 123, a B4 back-contact 124, a conductor 125, and a JR back-contact 126, to the negative bus (—).

The next circuit in Fig. 1B extends from the hold-wire 119 through a make-contact 127 of the spotting relay SR, and thence through a conductor 128 and a back-contact 129 of the brake-relay BR, to the field-controller circuit C2, which is connected to the shunted-field wire C1 through a field-controller contact-segment 28 which is closed in the field-controller positions FF through F3, so as to give the shunted-field magnet-coil FC–SF of the field-controller FC a brief energizing-impulse whenever an excessive spotting-current causes the spotting relay SR to touch its make-contact 127, during the "spotting" control of the dynamic-braking operation.

This field-controller segment 28 is preferably opened at a certain point near the shunted-field position SF, preferably before the field-controller FC reaches this shunted-field position SF.

In accordance with my present invention, I provide a circuit-connection from the conductor 128, through a make-contact 130 of the brake-relay BR, to the energizing-circuit 106 of the hold-coil BP-Hold. This connection 130 may be made at any time before the opening of the hold-coil energizing-circuit containing the B5 back-contact 105, so that, after the opening of said B5 back-contact 105, the energization of the hold-coil BP-Hold will be transferred to the control of the spotting relay SR, the operating coil of which is energized responsively to the braking-current, in the tapped-off circuit 22–T2 in Fig. 1A. This is for the purpose of causing the brake-power relay BP to be deenergized completely when a "service" dynamic-braking application proceeds to fade-out, so that the complete deenergization of the brake-power relay BP will substantially interrupt the dynamic-braking circuits at fade-out, in accordance with the general objects of the invention which is covered in my co-pending application Serial No. 669,611, filed July 2, 1957, for Traction Motor Acceleration and Dynamic-Braking Control.

A known connection is next provided, from the hold-wire 119 in Fig. 1B, passing through a back-contact 131 of the spotting relay SR, to energize the full-field conductor C7 of the full-field magnet-coil FC–FF of the field-controller FC, in order to notch the field-controller towards its full-field position, under the control of the spotting relay SR, whenever the spotting-current becomes lower than the setting of the spotting relay SR.

The control-circuit 54, which extends down from Fig. 1A, is connected, in Fig. 1B, to a BR make-contact 133, which is closed whenever a "service" dynamic-braking application is called for. This BR make-contact 133 energizes a circuit 134 which is used to initiate the dynamic-braking service-progression. This circuit 134 is connected directly to the energizing-circuit C7 of the full-field magnet-coil FC–FF of the field-controller FC, so as to move this field-controller to its full-field position FF, under the control of the CR limit-relay contact 51, when the service-braking interlock 133 is first closed, if the field-controller is not already in this full-field position as a result of the spotting-control.

The circuit 134 is also connected, through a BR make-contact 135, to a controller-circuit C4, which leads up to the field-controller FC in Fig. 1A; and when the braking-controlling progression has proceeded to the point at which full-field conditions are restored in the traction-motors, the field-controller FC closes its full-field contact-segment 29, which makes a connection from the controller-circuit C4 to the controller-circuit C3, which serves as a progress-line for controlling the progression of the braking-circuit resistances, under the control of the CR limit-relay contact 51, which is included in the energization of the control-circuit 51—52—53—54—133—134—135—C4.

As shown in Fig. 1B, the braking-circuit progression-wire C3, is first connected, through a G1 back-contact 136, to the accelerating-resistance progression-wire 67, and this wire 67 is connected, in the second line of Fig. 1B, through the two braking-circuit interlocks 79 and 79', on the braking-switches B1 and B5, so as to reenergize the circuit 72 which starts the progression of the accelerating-resistance switches R1 to R8, after the progression of the braking-switches B1 to B5 has been completed, during the dynamic-braking control.

The progress-line C3 is next connected, through a B1 make-contact 137, a conductor 138, a B2 back-contact 139, a conductor 141, and the B2 energizing-coil, to the previously mentioned circuit 123. When the braking switch B2 picks up, it closes a holding circuit from the hold-wire 119 through a B2 make-contact 142 to the conductor 141.

Fig. 1B next shows a branch-circuit from the progress-line C3 through a B3 back-contact 143 and a B2 make-contact 144 to a conductor 145, and thence through the B3 operating-coil to the previously mentioned circuit 123. This circuit 123 is connected on, through a B5 make-contact 145', to the previously mentioned conductor 125. As soon as the B3 switch is actuated, it completes a holding-circuit from the hold-wire 119 through a B3 make-contact 146 to the circuit 145.

In Fig. 1B, the progress-wire C3 is next shown as being connected through a circuit which extends through a B5 back-contact 147 to a conductor 148. A connection is made from the conductor 148 through a B3 make-contact 149 and a conductor 149' to the B4 energizing-coil, and then to the previously mentioned conductor 125. As soon as the B4 switch picks up, it energizes a holding-circuit from the hold-wire 119 through a B4 make-contact 150 to the aforesaid conductor 149'.

The conductor 148 is also connected, through a branch-circuit which extends through a B2 back-contact 151 and a B4 make-contact 152, to a circuit 154, and thence through the B5 actuating-coil to the conductor 125. As soon as the B5 switch closes, it closes a holding-circuit from the hold-wire 119 through a B5 make-contact 155 to the conductor 154.

A circuit is next shown, in Fig. 1B, from the progress-wire C3, through a B5 make-contact 156, to the conductor 138, which is included in the energization of the second braking-switch B2 when said switch is in its closed position.

The bottom of the progress-wire C3, in Fig. 1B, is connected, through a B1 back-contact 157, and a B3 make-contact 158, to the energizing-circuit 122 of the first braking-switch B1. At the bottom of Fig. 1B, a circuit is made from the hold-wire 119, through a B1 make-contact 159 and a B5 make-contact 160, to the aforesaid energizing-circuit 122 of the first braking-switch B1.

The operation of the illustrated circuit-connections, which have now been described, is shown in Fig. 2, which is a sequence chart which will suffice as a basis for explaining the novel features of my invention. The general plan of the sequence chart is well known to all who are familiar with the past practices of the art, in controlling both the power-operation and the dynamic-braking operation of traction-motors for electrically propelled railway-cars. As is customary in this sort of chart, a small circle indicates a closed position of a contact or an energized condition of a coil or circuit. I shall direct my explanations more particularly to the special features of my invention. When the car is first being readied for operation, with the master controller MC in its off-position, and with no power on the supply-circuit 18 for the motors, as shown in step A of the sequence chart, the supply-line 18 will first be energized, thereby picking up the line-relay LR as shown in step B.

The train is then ready for a power-operation, in which the brake-valve BV is moved to its off-position, and the master controller MC is moved either immediately to its No. 3 on-position, or in a step-by-step manner to successive on-positions 1, 2 and 3, resulting in the well-known power-operation steps which are exemplified by steps P1 to P7, a transition step TR, and steps P8 to P15 in Fig. 2.

When the motorman wishes to discontinue the power-operation, he returns the controller through positions 2 and 1 to the off-position, resulting in steps PA, PB, PC, D and 1 of the illustrative sequence chart, which has been prepared on the assumption that the cutting off of power followed a full-parallel, shunted-field, operating-step P15, although it will be understood, of course, that the master controller could be returned to its off-position from any other step of the power-operation of the motors.

As long as the master controller is in any on-position, such as 2 or 1, as indicated by the steps PA and PB in the sequence chart, none of the previously closed motor-operating switches or contacts are disturbed, because they are all held by suitable holding-circuits which have been described.

It will be noted that, when the controller is moved from its No. 1 on-position, as shown in step PB, toward its off-position, the wire GS is deenergized, and the wire 3 is energized, as shown in step PC of the chart; and the open wire GS deenergizes the light-weight, quickly moving door-brake relay DB, which quickly energizes the BP hold-coil BP-Hold at the DB interlock 99, as covered in my previously mentioned application Serial No. 642,742. As shown in step D of the chart, the open wire GS also deenergizes the heavier, more slowly moving, ground-switch G1, while the DB interlock 34 deenergizes the heavy, slowly moving line-switch LS1. The G1 interlock 45 deenergizes the BP closing-coil BP-Close, the second line-switch LS2, the resistance-switches R2 to R8, and the parallel-connection switches M and G; but before these M and G switches can open, they are energized through the LS1 interlock 107, the BP interlock 109, and the G1 interlock 111, all as shown in step D of the chart.

The opening of the line-switch LS1 also causes an energization of the heavy, slowly moving braking-switch B1, through the LS1 interlock 107, the BP interlock 109, and the G1 interlock 113. This braking-switch B1 thereupon closes its main-circuit contact B1, thereby completing a dynamic-braking circuit, in the spot-step 1, and also energizing the spotting relay SR, as shown in Fig. 2. Meanwhile, the master controller has been continuing to move away from its No. 1 on-position toward its off-position; and either before the braking-circuit is completed at B1, or at about the same time, as shown in step 1, the wires 12′ and 6 are deenergized at the master controller.

During the continuance of the spotting condition of the dynamic-braking circuits, the spotting relay SR touches its back-contact 131 whenever the spotting-current is undesirably small, thereby notching the field-controller FC toward its full-field position FF, through the progression-circuit 131–C7, as shown in steps 2 and 3 of the sequence chart.

If, now, the motorman desires a "service" application of dynamic braking, he moves the brake-valve BV to an on-position, moving it little or much, according to the amount of braking which he desires. As shown in step 4 of the sequence chart, this on-movement of the brake-valve BV results in actuating the brake-relay BR, through the BV interlock 61. The brake-relay BR closes its make-contact 23 which energizes the lock-out magnet LOM from the braking-current tap 22, thus preventing an air-brake application. At the same time, the brake-relay BR closes its make-contact 62 and establishes a braking-operation progression-circuit 3—61—5—62—50 to the back-contact 51 of the limit-relay CR, thereby activating the progression-circuit 51—53—54—133—134 whenever the limit-relay CR touches its aforesaid back-contact 51. The conductor 134 energizes the full-field wire C7 to move the field-controller FC to its full-field position FF if the controller has not already been adjusted to this position by the operation of the spotting control. The conductor 134 is also connected, through the BR interlock 135, to the controller-circuit C4, thus introducing the resistance-reducing part of the dynamic-braking progression, through the circuit C4—29—C3, which is completed by the closure of the field-controller contact 29 in the full-field position FF.

During the remainder of the dynamic-braking operation, successive sequence-steps are taken, in a well-known manner, as shown at steps 4 to 15 of the sequence chart, each step being taken upon the subsidence of the braking-current to a value which is small enough to permit the limit-relay CR to close its back-contact 51.

When the last two braking-steps 14 and 15 are taken, the dynamic-braking operation has substantially reached its fade-out point, the braking effort being very small, and the car-speed being close to zero, perhaps something like two or three miles per hour. In step 15, the last resistance-switch R8 is closed, and its interlock 24 deenergizes the lock-out magnet LOM, thus opening the lock-out valve LOV and bringing the air-brake equipment into operation (or into stronger operation if it had been in limited operation), so as to bring the car to a complete standstill.

My present invention incorporates, in a somewhat different control-assembly or wiring-circuit, one of the features of my previously mentioned application Serial No. 669,611, whereby the dynamic-braking circuits, such as are shown in the last braking-step 15 of the sequence chart (Fig. 2 of the accompanying drawings), will be substantially interrupted (or completely interrupted as I have shown it), before the car comes to a complete stop. The last braking-step 15, wherein the last resistance-switch R8 is closed, represents a fade-out condition, in which the dynamic-braking effort is too small to be effective. As shown in Fig. 1A, the R8 back-contact 24 of this last resistance-switch R8 thereupon opens and deenergizes the lock-out magnet LOM, which opens the lock-out valve LOV, and makes an effective air-brake application, for bringing the slowly moving car to a stop.

While the speed of the car is still further decreasing, under the influence of the air-brakes, the braking-current in the dynamic-braking circuits is becoming smaller and smaller, and at a certain point, the spotting relay SR, which has remained fully energized in response to the heavy braking-currents of the preceding portion of the service-application of dynamic-braking, opens its make-contact 127, as shown in the first line of the fade-out operation in the attached sequence chart, Fig. 2, and thus deenergizes the circuit 127—128—130—106 of the hold-coil PB-Hold, as shown in the second line of the fade-out operation in the attached sequence chart. The brake-power relay PB thereupon opens its make-contacts 53, 100 and 109, thereby interrupting all of the braking-circuit switches, as shown in the third line of the fade-out operation in the sequence chart. The general principle of this dynamic-brake release is to change a suitable holding or energizing-circuit, such as that of the BP-Hold coil, from an initial constant-voltage energization, such as the battery-energized circuit (+)—99—100—101—105—106, to a braking-current-responsive control, such as the circuit 22–T2 which energizes the SR coil which controls the holding-circuit 127—128—130—106.

One of the features of my present invention is shown in the second power-operation step P2 of the sequence chart, wherein it is shown that the main energizing-coil PB-Close of the brake-power relay does not become energized when power is first applied to the traction-motors, as in previous equipments, but this coil now becomes energized only when the master controller MC is moved to its No. 2 on-position, which energizes the wire 4 and initiates the automatic power-circuit progression, starting with a closure of the second line-switch LS2. I bring this action about, by causing the operating-coil BP-Close to be energized from the same circuit, 57, which energizes the LS2 coil.

This manner of energization of the brake-power relay-coil PB-Close is intended to be representative of any suitable means whereby the energization of this BP coil BP-Close is delayed until the car is beginning to accelerate or pick up speed, or until the car-controlling circuits have advanced to any desired point in the accelerating progression. The simple circuit-connection, which I have illustrated, will usually suffice to safeguard any subsequent dynamic-braking service-application, by energizing the brake-power relay BP simultaneously with the energization of the second line-switch LS2.

Since the brake-power relay BP has to be energized, before the dynamic-braking circuit can be completed, this delay in the energization of the brake-power relay BP serves to prevent any establishment of the dynamic-braking circuit until the car has attained enough speed so that, when dynamic braking is applied, the dynamic-brake build-up will be sufficiently rapid to avoid an air inshot on the air-brake system, such as has plagued previous dynamic-braking controls.

The last twelve lines of the sequence chart illustrate another feature of my present invention, whereby I make it possible to release a "service" dynamic-brake circuit of a dead car, so that it can be towed without burning out the braking and accelerating resistors, while still making dynamic braking available on third-rail gaps and in the event of the loss of third-rail power on an entire multiple-unit train. The difficulty which my invention overcomes results from a loss of power which may occur in one car of a multiple-unit train, unknown to the motorman, while the train is operating in any running-position, with power applied to the traction-motors. By way of indicating a concrete example, in Fig. 2, I have assumed that the train is operating in the last power-step P15, as shown on the chart, when a blown third-rail fuse 17, or other mishap, causes a loss of power on the illustrated car, resulting in the dropping out of the line-relay LR, as shown in step * of the chart. The LR back-contact 102 thereupon quickly energizes the BP-Hold coil, as shown in step *A; and the LR interlock 33 deenergizes the more slowly moving line-switch LS1, as shown in step *B. The opening of the LS1 switch thereupon deenergizes all of the other switches except the ground-switch G1, deenergizes the BP-Close coil, and energizes the full-field controller-coil FC-FF, leaving the brake-power relay BP and the door-brake relay DB both energized, as shown in step *C.

Because the brake-power relay BP is still energized, through its hold-coil BP-Hold, it is still possible for the motorman to obtain a dynamic-braking circuit on the dead car, by moving his master controller off, from the No. 3 on-position, through positions 2 and 1, to the off-position, as shown in successive steps *D, *E and *F of the chart. The G1 switch and the DB relay are not deenergized until the deenergization of the GS when the controller reaches the off-position, but the circuit of the BP-Hold coil is maintained at the DB interlock 99, as shown in step *F. The back-contacts 111 and 118 of the G1 switch thereupon energize the parallel-connection switches M and G and the first braking-switch B1, thus setting up the spotting-circuit and energizing the spotting relay SR; and the spotting relay SR promptly closes its make-contact 127 because of the high speed of the car, and this contact 127 energizes the shunt-field magnet-coil FC–SF, through the circuit 127—128—129—C2—28—C1, producing a shunted-field condition, through the controller-contacts C10 to C17, all as shown in step *G of the chart.

If now, while the circuits are in the spotting step *G, the motorman should again turn his master controller on, without first turning his brake-valve BV on, (a condition which is not shown on the chart), the GS wire will energize the DB relay and interrupt the braking circuit controls at the DB interlock 99, so that the car can be towed if its line-relay LR is still out, or so that the power-operation of the car will begin if its LR relay is by that time reenergized.

It is an important feature of my invention, that, when the spotting step *G has been reached, during a loss-of-power condition, one "service" dynamic-braking operation is obtainable, in response to a movement of the brake-valve BV to an on-position, which thereupon transforms the spotting circuit of step *G to any dynamic-braking service-operation step, as has been described in connection with steps 4 to 15 of the chart. Such a dynamic-braking service-application might be permitted to progress as far as desirable, even to fade-out, as in any other service-application of dynamic braking. However, by way of choosing a concrete example, I have assumed that the service-application progression of the dynamic braking has proceeded to an early intermediate stage, at least as far as step *8, so that the B5 back-contact 105 has been opened; and I have assumed that the motorman then releases the dynamic-braking circuits by moving his brake-valve BV to the off position, as shown in step *H of the chart. This deenergizes the brake relay BR, which deenerigizes the BP-Hold coil at the BR interlock 130, causing the brake-power relay BP to drop out; and the BP interlocks 100 and 109 deenergize all of the braking-circuit switches, thus completely open-circuiting the dynamic-braking circuit, and also, of course, deenergizing the spotting relay SR, all as shown in step *H.

After this one service-application of dynamic braking, which is permitted during loss of power, as symbolized in step *8, no further dynamic-braking is possible, because of the open condition of the BP relay as shown in step *H. Thereafter, if the motorman should turn his master controller to any on-position, such as the No. 1 position, as shown in step *I, the only result will be the energization of the DB relay: none of the power-circuit switches will be actuated, assuming that the line-switch LR continues to be deenergized. The car can thus be safely towed, as a dead car of a multiple-unit train.

If the "service" application of dynamic braking had been very quickly interrupted, by the opening of the brake-valve BV before the braking step *8 had been reached, in Fig. 2, then any braking-circuit switches which had been closed would remain closed (by reason of the hold-circuit 119), through step *H and until the motorman moved the master controller to an on-position, similar to step *I, whereupon a door-brake relay DB would pick up and deenergize said hold-circuit 119 at the DB interlock 99 (in the illustrated form of embodiment of my invention), thus opening all of the switches in the dynamic-braking circuits, as shown in step *I in Fig. 2.

In applying the essential principles of my invention, in other control-assemblies, it may not always be necessary that a "service" dynamic-braking circuit should be completely interrupted (with an infinite resistance therein), in order that the car may be towed without burning out the braking-circuit resistors, because, if the braking-circuit resistance is not too small, the dynamic-braking current will not be large enough to burn out the resistors when the car is towed. I desire, therefore, that my explanations shall be understood to embrace a substantial, if not a complete, interruption of the dynamic-braking circuits, after a "service" brake-application on a dead car.

It will be understood that, in all such complicated control-circuit arrangements, such as are necessary for controlling the acceleration and the dynamic-braking of an electrically propelled car, there are a great many alternative and substantially equivalent circuit-expedients, which can be used, and which from time to time are used, for accomplishing essentially the same results by essential equivalents of the same circuit means or expedients. While, therefore, I have illustrated my invention in but a single exemplary arrangement, and while I have greatly simplified this illustration by omitting many known features, some of which would be practically necessary in any competitively acceptable control-system, I wish it to be clearly understood that I am not altogether limited to the precise details of every illustrated connection; and that the broader aspects of my invention contemplate the possibility of the substitution of equivalents for one or more of the circuit-elements, the addition of other circuit-elements which have not been shown in my simplified drawings, and the omission of details or elements which may not be needed in some installations.

I claim as my invention:

1. A control system for a plurality of direct-current series motors, said system including switching means for establishing power circuits for operation of said motors, said power circuits including accelerating resistors, switching means for establishing a dynamic braking circuit for said motors, said braking circuit including a braking resistor, control means for effecting operation of said first-mentioned switching means to connect the motors to a direct-current power source and for effecting progressive shunting of the accelerating resistors in a predetermined sequence of steps, a protective relay for controlling said braking circuit, said protective relay having an actuated position and a non-actuated position, means for effecting establishment of said braking circuit when the protective relay is in its actuated position, braking control means for effecting progressive shunting of the braking resistor in a predetermined sequence of steps, and means responsive to the current in the braking circuit for causing the protective relay to operate to its non-actuated position to effect interruption of the braking circuit when said current falls below a predetermined value.

2. A control system for a plurality of direct-current series motors, said system including switching means for establishing power circuits for operation of said motors, said power circuits including accelerating resistors, switching means for establishing a dynamic braking circuit for said motors, said braking circuit including a braking resistor, control means for effecting operation of said first-mentioned switching means to connect the motors to a direct-current power source and for effecting progressive shunting of the accelerating resistors in a predetermined sequence of steps, a protective relay for controlling said braking circuit, said protective relay having an actuated position and a non-actuated position, means for effecting establishment of said braking circuit when the protective relay is in its actuated position, braking control means for effecting progressive shunting of the braking resistor in a predetermined sequence of steps, means for holding the protective relay in its actuated position until said progressive shunting of the braking resistor has reached a predetermined step in said sequence, and means responsive to the current in the braking circuit for thereafter holding the protective relay in its actuated position and for causing the relay to operate to its non-actuated position to effect interruption of the braking circuit when said current falls below a predetermined value.

3. A control system for a plurality of direct-current series motors, said system including switching means for establishing power circuits for operation of said motors, said power circuits including accelerating resistors, switching means for establishing a dynamic braking circuit for said motors, said braking circuit including a braking resistor, a controller having an off position and having a plurality of on positions for effecting operation of the first-mentioned switching means to connect the motors to a direct-current power source and for effecting progressive shunting of the accelerating resistors in a predetermined sequence of steps, a protective relay having an operating coil for operating the relay to actuated position and having a holding coil for holding the relay in actuated position, means for energizing said operating coil when the controller is in an on position, means for effecting operation of said second-mentioned switching means to establish the braking circuit when the protective relay is in its actuated position and the controller is returned to its off position, braking control means for effecting progressive shunting of said braking resistor in a predetermined sequence of steps, holding circuit means for effecting energization of said holding coil to hold the protective relay in actuated position, means for energizing said holding circuit means when the controller is in off position until said progressive shunting of the braking resistor has reached a predetermined step in said sequence, and means responsive to the current in the braking circuit for thereafter maintaining the energization of the holding circuit means until said current falls below a predetermined value.

4. A control system for a plurality of direct-current series motors, said system including switching means for establishing power circuits for operation of said motors, said power circuits including accelerating resistors, switching means for establishing a dynamic braking circuit for said motors, said braking circuit including a braking resistor, a controller having an off position and having a plurality of on positions for effecting operation of the first-mentioned switching means to connect the motors to a direct-current power source and for effecting progressive shunting of the accelerating resistors in a predetermined sequence of steps, a protective relay having an operating coil for operating the relay to actuated position and having a holding coil for holding the relay in actuated position, means for energizing said operating coil when the controller is in an on position other than the first on position, means for effecting operation of said second-mentioned switching means to establish the braking circuit when the protective relay is in its actuated position and the controller is returned to its off position, braking control means for effecting progressive shunting of said braking resistor in a predetermined sequence of steps, holding circuit means for effecting energization of said holding coil to hold the protective relay in actuated position, means for energizing said holding circuit means when the controller is in off position until said progressive shunting of the braking resistor has reached a predetermined step in said sequence, and relay means responsive to the current in the braking circuit, said relay means being adapted to maintain the energization of the holding circuit means while said current is above a predetermined value and to deenergize the holding circuit means when the current falls below said value to cause the protective relay to move to non-actuated position to effect interruption of the braking circuit.

5. A control system for a plurality of direct-current series motors, said system including switching means for establishing power circuits for operation of said motors, said power circuits including accelerating resistors, switching means for establishing a dynamic braking circuit for said motors, said braking circuit including a braking resistor, a controller having an off position and having a plurality of on positions for effecting operation of said first-mentioned switching means to connect the motors to a direct-current power source and for effecting progressive shunting of the accelerating resistors in a predetermined sequence of steps, a line relay energized in response to the voltage of said power source, a protective relay for controlling said braking circuit, said protective relay having an actuated position and a non-actuated position, means for effecting operation of the second-mentioned switching means to establish the braking circuit when said protective relay is in its actuated position and said controller is moved to its off position, means for effecting operation of the protective relay to its actuated position when the line relay is energized and the controller is moved to an on position, and means responsive to deenergization of the line relay for maintaining the protective relay in actuated position.

6. A control system for a plurality of direct-current series motors, said system including switching means for establishing power circuits for operation of said motors, said power circuits including accelerating resistors, switching means for establishing a dynamic braking circuit for said motors, said braking circuit including a braking resistor, a controller having an off position and having a plurality of on positions for effecting operation of said first-mentioned switching means to connect the motors to a direct-current power source and for effecting progressive shunting of the accelerating resistors in a predetermined sequence of steps, a line relay energized in response to the voltage of said power source, a protective relay for controlling said braking circuit, said protective relay having an actuated position and a non-actuated position, means for effecting operation of the second-mentioned switching means to establish the braking circuit when said protective relay is in its actuated position and said controller is moved to its off position, means for effecting operation of the protective relay to its actuated position when the line relay is energized and the controller is moved to an on position, braking control means for effecting progressive shunting of the braking resistor in a predetermined sequence of steps, holding circuit means for maintaining the protective relay in its actuated position, means responsive to deenergization of the line relay while the controller is in an on position for energizing said holding circuit means, means for energizing the holding circuit means upon movement of the controller to off position, and means for maintaining energization of the holding circuit means during operation of the braking control means beyond a predetermined step in said sequence and for thereafter effecting deenergization of the holding circuit means upon actuation of the braking control means to brake-releasing position.

7. A control system for a plurality of direct-current series motors, said systems including switching means for establishing power circuits for operation of said motors, said power circuits including accelerating resistors, switching means for establishing a dynamic braking circuit for said motors, said braking circuit including a braking resistor, a controller having an off position and having a plurality of on positions for effecting operation of said first-mentioned switching means to connect the motors to a direct-current power source and for effecting progressive shunting of the accelerating resistors in a predetermined sequence of steps, a line relay energized in response to the voltage of said power source, a protective relay for controlling said braking circuit, said protective relay having an actuated position and a non-actuated position, means for effecting operation of the second-mentioned switching means to establish the braking circuit when said protective relay is in its actuated position and said controller is moved to its off position, means for effecting operation of the protective relay to its actuated position when the line relay is energized and the controller is moved to an on position, braking control means for effecting progressive shunting of the braking resistor in a predetermined sequence of steps, holding circuit means for maintaining the protective relay in its actuated position, means responsive to deenergization of the line relay while the controller is in an on position for energizing said holding circuit means, means for energizing the holding circuit means upon movement of the controller to off position, means for maintaining energization of the holding circuit means during operation of the braking control means until a predetermined step is reached in said sequence, and means for thereafter deenergizing the holding circuit means in response to decrease of the current in the braking circuit below a predetermined value or to actuation of the braking control means to brake-releasing position.

References Cited in the file of this patent

UNITED STATES PATENTS

| | | |
|---|---|---|
| 2,597,183 | Riley | May 20, 1952 |
| 2,653,284 | Purifoy et al. | Sept. 22, 1953 |